Figure 7:
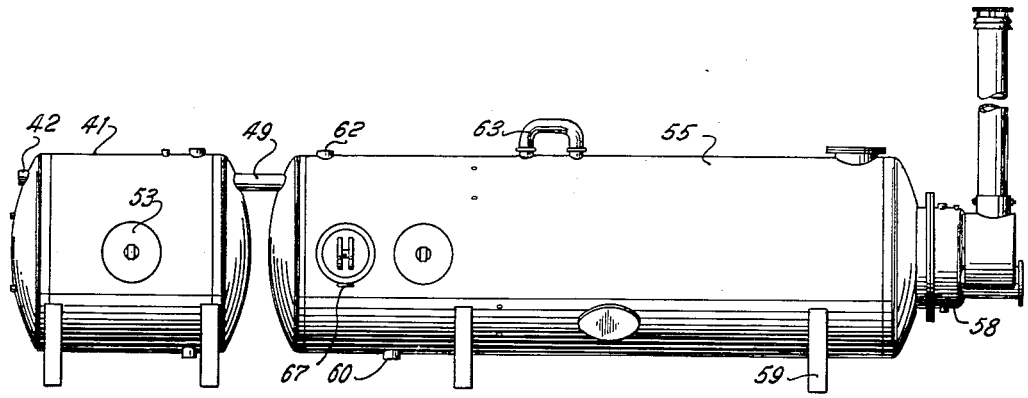

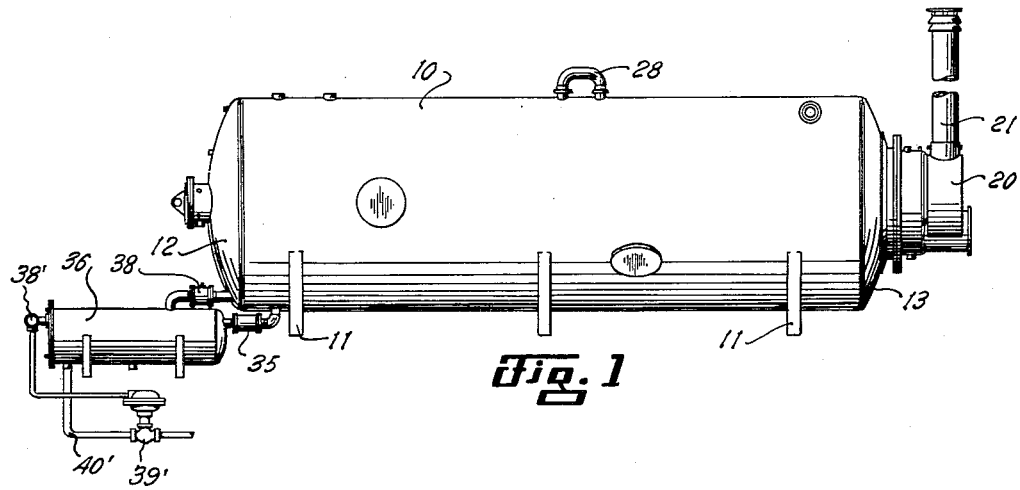
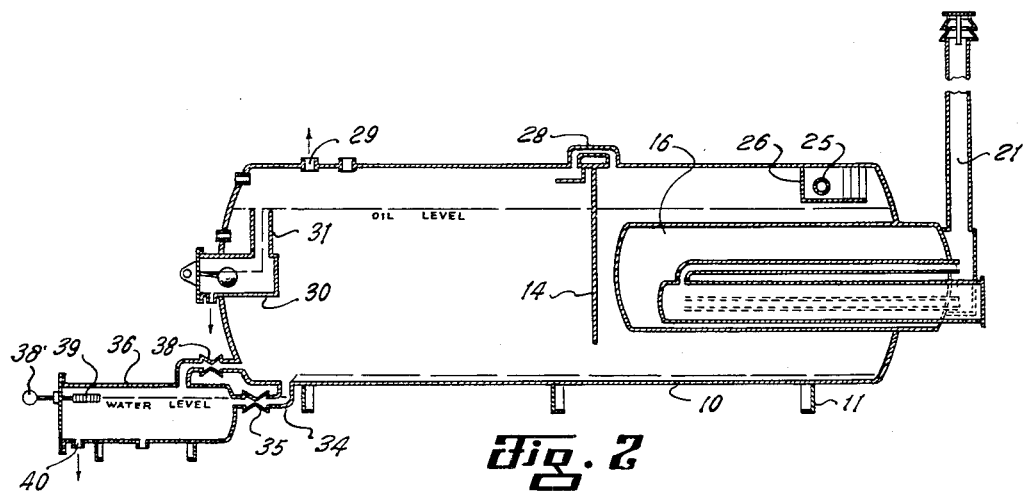
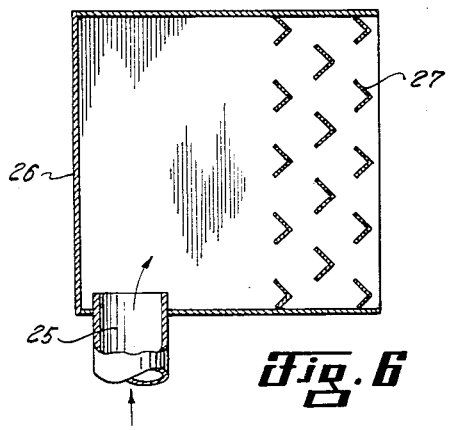
INVENTOR.
Clarence O. Glasgow

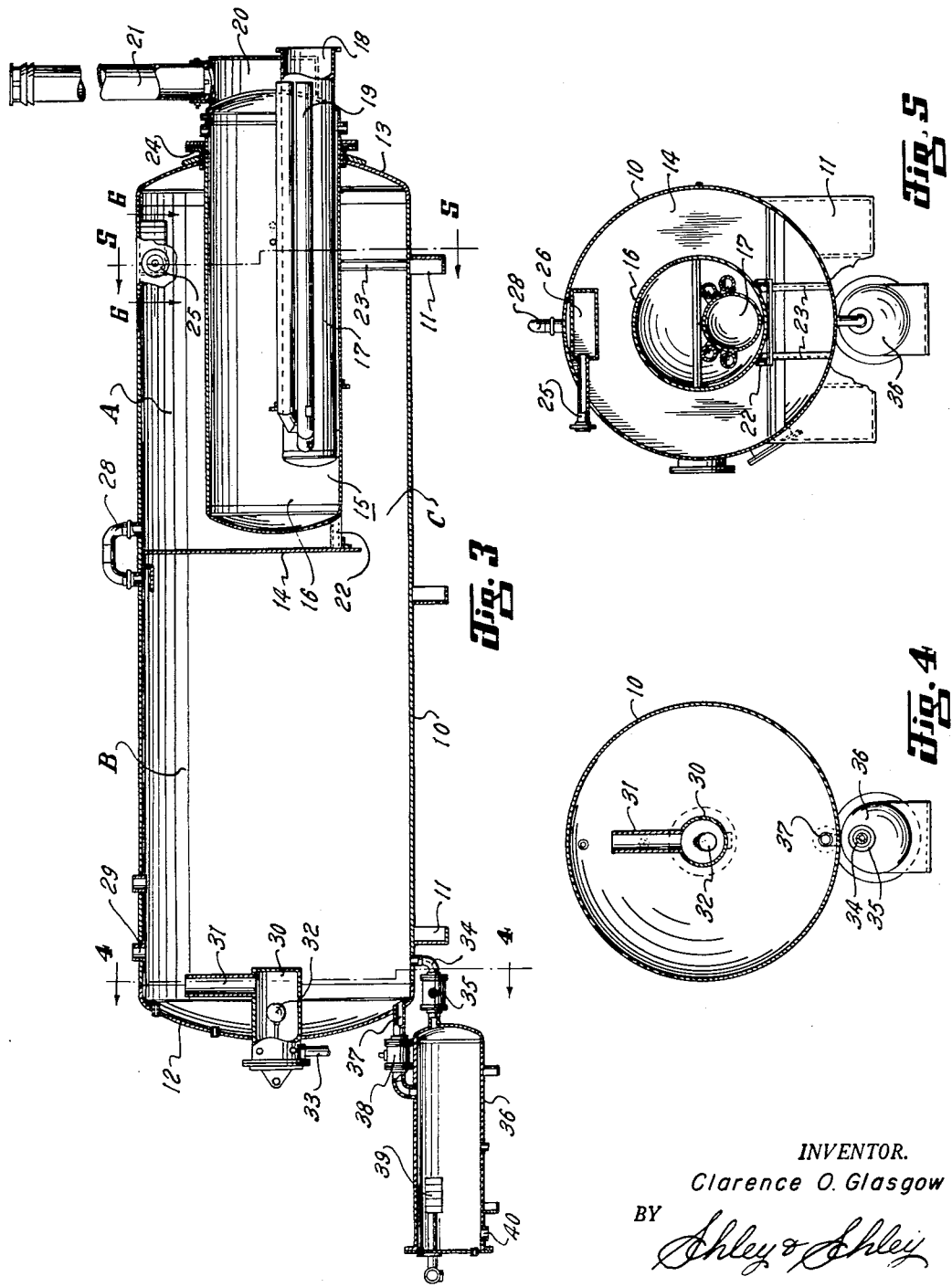

June 26, 1956  C. O. GLASGOW  2,751,998
EMULSION TREATERS AND EMULSION TREATING METHODS
Filed June 1, 1953  4 Sheets-Sheet 3

INVENTOR.
Clarence O. Glasgow
BY Ashley & Ashley
ATTORNEYS

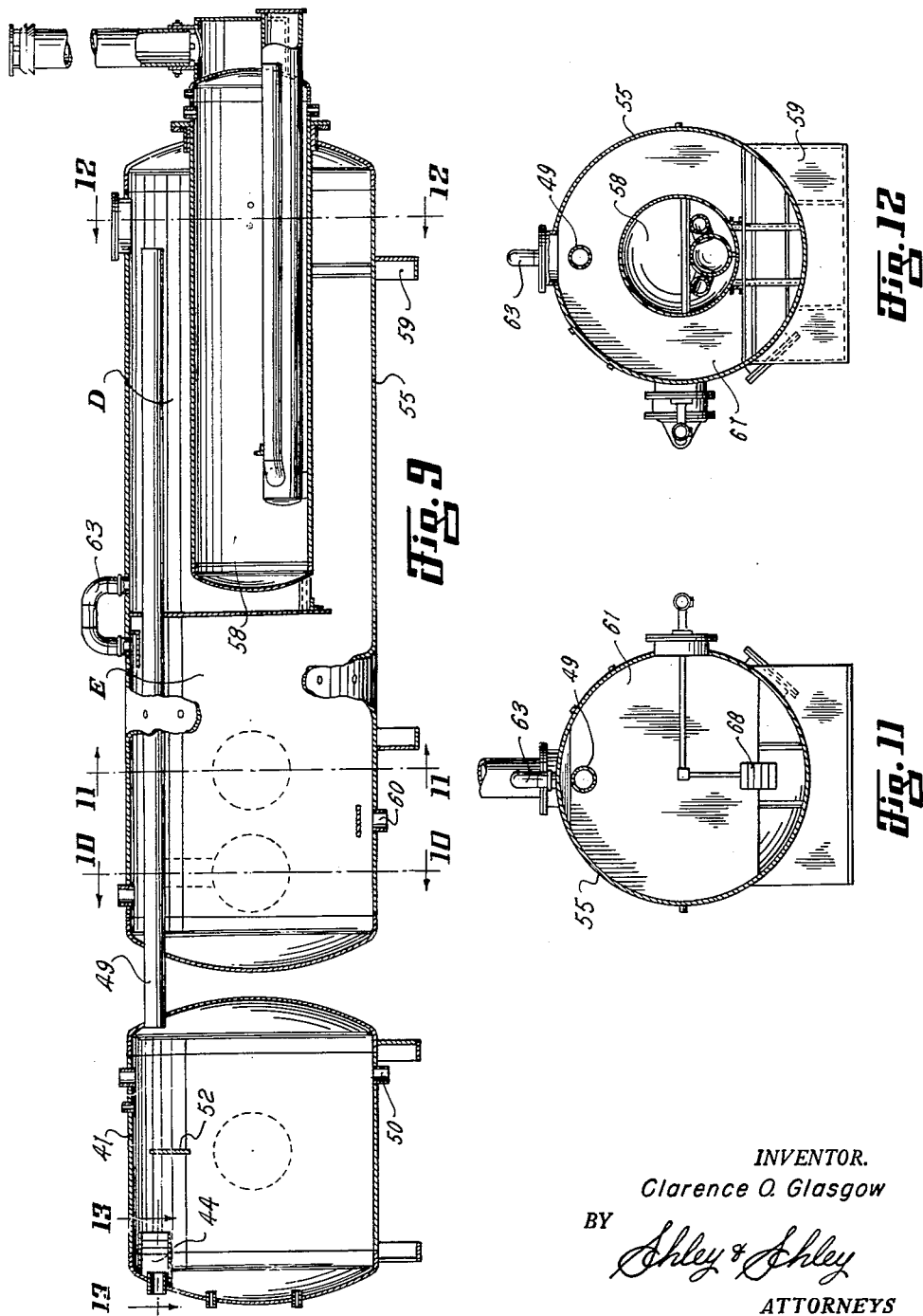

United States Patent Office 2,751,998
Patented June 26, 1956

2,751,998

EMULSION TREATERS AND EMULSION TREATING METHODS

Clarence O. Glasgow, Tulsa, Okla., assignor to National Tank Company, Tulsa, Okla., a corporation of Nevada Application June 1, 1953, Serial No. 358,918

12 Claims. (Cl. 183—2.7)

This invention relates to new and useful improvements in emulsion treaters and emulsion treating methods.

The invention is concerned with the treating of oil field emulsions in order to break the same and resolve the emulsion into separate oil and water strata while removing gas therefrom.

Oil wells in certain localities, and wells of certain types, produce flow streams which are corrosive in nature, usually due to the presence of hydrogen sulphide, or other acidic gases, corrosive types of water present in the emulsion, and other corrosive components. In nearly every instance, the oil itself, when it has been separated from the water, is not as corrosive as the well stream and will not damage to an undesirable extent the metal of an emulsion treating tank or vessel through which it is flowing. In such wells, however, the separated water stratum is often, if not always, corrosive in nature and many times causes failure of a treater vessel within a very short period.

It is, therefore, an important object of this invention to provide an improved emulsion treater adapted to resolve oil field emulsion streams into separate oil and water strata, and wherein the water stratum is promptly and continuously withdrawn into a separate, inexpensive vessel which may be replaced at low cost as corrosion thereof occurs.

A further object of the invention is to provide an improved emulsion treater and emulsion treating method wherein the emulsion stream is passed downwardly over a firing unit which exposes to the emulsion stream only moderately heated surfaces, in which the heated emulsion stream is caused to flow in an elongate, substantially horizontal path, and in which separated water is promptly and continuously withdrawn whereby the enclosure in which the emulsion stream is heated and in which stratification and separation takes place, is maintained free at all times of an accumulated body of corrosive aqueous material.

Still another object of the invention is to provide an improved emulsion treater and emulsion treating method in which the well stream is delivered into a heating zone and therein caused to flow downwardly over a heating unit exposing only moderately heated surfaces to the well stream, the well stream being heated in the chamber so as to drive off gas therefrom and the gas being withdrawn from the upper portion of the chamber, the well stream then being flowed horizontally from the lower portion of the heating chamber into a separation and stratification chamber wherein the emulsion is resolved into clean oil and aqueous layers, the removal of the large majority of the gas in the heating chamber protecting the settling chamber against turbulence and agitation by separation and stratification is encouraged.

Yet an additional object of the invention is to provide an emulsion treater of the character described having a separate water separation enclosure positioned in advance of the treater wherein free water may be removed from the well stream, the separation vessel being relatively simple and inexpensive and subject to ready replacement in the event of accelerated corrosion due to the nature of the separated free water.

A further object of the invention is to provide an improved emulsion treater having heating and stratification chambers arranged in side-by-side relationship and having an emulsion stream inlet conductor extending in heat exchange relationship with the upper portions of both chambers.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a side elevational view of an emulsion treater constructed in accordance with this invention and adapted to carry out the emulsion treating methods herein disclosed, Fig. 2 is a diagrammatical, longitudinal, vertical, sectional view of the treater shown in Fig. 1, Fig. 3 is a longitudinal, vertical, sectional view of the treater, Figs. 4 and 5 are vertical, cross-sectional views taken upon the respective lines of Fig. 3, Fig. 6 is an enlarged, horizontal, sectional view taken upon the line 6—6 of Fig. 3, Fig. 7 is a side elevational view of a modified form of the invention illustrating a modified form of treater constructed in accordance with this invention.

Figure 8:
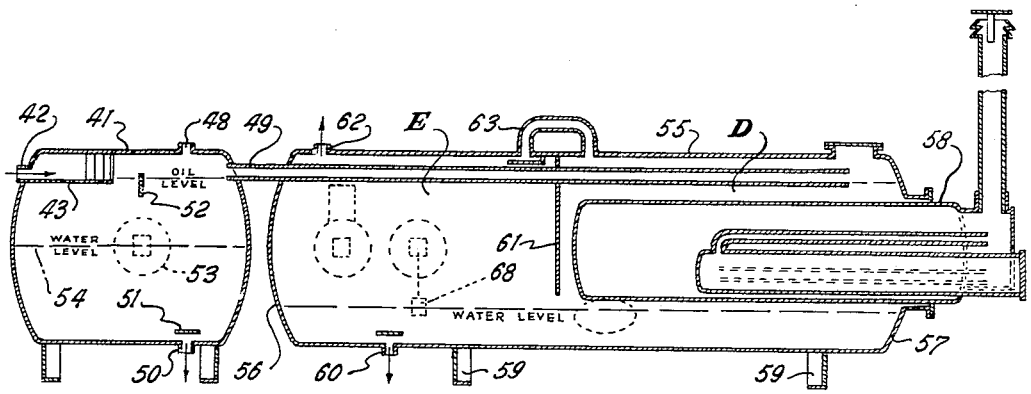
Figures 10, 13:
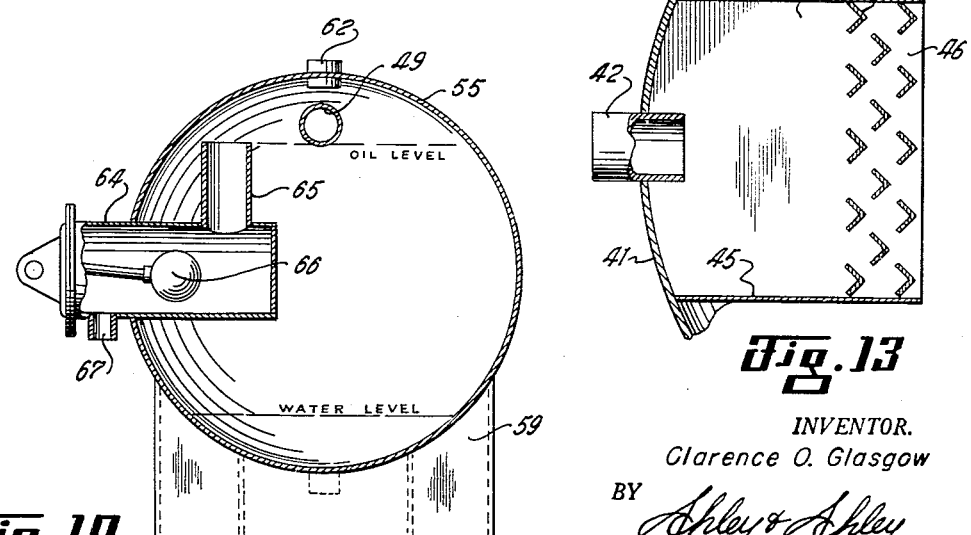

Fig. 8 is a diagrammatic, vertical, longitudinal, sectional view of the treater shown in Fig. 7, Fig. 9 is a longitudinal, vertical, sectional view of the treater shown in Fig. 7, Figs. 10, 11 and 12 are vertical, cross-sectional views taken upon the respective lines of Fig. 9, and Fig. 13 is an enlarged, horizontal, sectional view taken upon the line 13—13 of Fig. 9.

In the drawings, the numeral 10 designates an elongate, horizontal tank supported upon suitable bolsters 11. The oil outlet end of the tank is closed by a dished head 12, and the heater end of the tank is closed by a similar dished head 13. Within the tank, and approximately at its medial portion, a vertical partition 14 extends downwardly from the upper wall of the tank to a point spaced from the bottom of the tank so as to form in the tank a heating chamber A and a settling chamber B communicating with one another through the space or flow passage C beneath the lower edge of the partition 14. Thus, the chambers A and B are placed in communication at their lower portions, and most important, an elongate, continuous, unimpeded flow path is provided in the bottom of the tank 10.

The firing or heating unit 15 is disposed within the chamber A and extends horizontally along the central portion of the heating chamber from the head 13 to a point adjacent the partition 14. The heating unit is desirably of the type shown in the patent to Glasgow and Maher, Re. 23,628, and includes an elongate horizontal drum 16 having therein a fire-tube 17. The drum 16 is adapted to contain a body of fresh water or other inert and non-corrosive heat exchange fluid, and heat is transferred at a moderate uniform rate from the fire-tube 17 through the heat exchange fluid in the drum 16 to the walls of the drum 16 as by heating and convection flow of the heat exchange fluid, or by vaporization and condensation of said fluid. The usual fire-box 18 is provided at the outer end of the fire-tube 17, the return tubes 19 of the fire-tube connecting into a smoke-box 20 from which a stack 21 carries combustion gases upwardly for dissipation. While the heating unit 15 may be mounted in the heating chamber A in any suitable or desirable fashion, it has been found desirable to support a pair of angle iron tracks 22 between the partition and legs 23 extending upwardly from the bottom of the tank 10, and to insert the firing unit into the chamber A through a flanged fitting 24 provided in the head 13. With this arrangement, the firing unit is readily removable and yet is held securely and positively in position within the chamber A.

The emulsion stream is introduced into the upper portion of the chamber A through a horizontal emulsion inlet pipe 25 extending transversely of the tank 10 and entering the same adjacent the head 13 chordally near the upper wall of the tank. The inner end of the pipe 25 communicates with an inlet box 26 mounted in the upper portion of the tank (Fig. 5), the box having a closed top and bottom and being closed on all sides except the side facing the head 13. A plurality of baffle elements 27 extend vertically within the box 26 adjacent its open side whereby fluid flowing from the box into the interior of the heating chamber A has its velocity of flow reduced, and surging or heading of the incoming fluid is to some extent impeded.

The incoming emulsion stream will consist of emulsified oil and water, gas both in the free state and in solution, possibly some free water and possibly some free or unemulsified oil. This commingled stream passes from the box 26 to the interior of the heating chamber A and flows downwardly therein. As shown in Fig. 2, the oil level in the treater is maintained closely beneath the inlet 25, and the body of oil within the chamber A will be in a heated condition by reason of the firing of the heating unit 15. Hence, as the incoming emulsion stream enters into and commingles with the body of hot oil, the emulsion stream will be heated to the desired degree which normally will be in the range of from 110° to 190° Fahrenheit. Most often, in the present type of emulsion treater, the heating will range from a temperature of 110° to 160° or 170° Fahrenheit.

As the emulsion stream is heated, the dissolved gas is caused to break loose therefrom, and resolving or breaking of the emulsion commences. The free water, being heavier than the oil or the emulsion will course rather directly to the bottom of the chamber A, some heated oil may move upwardly in the chamber since there is constantly present in the chamber a body of heated oil, but the net flow of the oil and emulsion will be downwardly and partially horizontally in the chamber A toward the flow passage or space C. Because of the very large volume of the chamber A as compared to the inlet pipe 25, the flow through the chamber will be relatively slow and gentle whereby ample opportunity is provided for bringing the emulsion stream up to the desired treating temperature. Thus, as the heated stream passes through the space C into the settling chamber B, conditions have been established favorable to complete separation and stratification of the emulsion stream components in said chamber B. The emulsion stream has been adequately heated, practically all of the free water has immediately settled out, gas in solution has been evolved due to the heating, and such gas has been withdrawn from the vicinity of the emulsion stream.

The chamber B constitutes an elongate, horizontal chamber of considerable volume into which the heated emulsion stream is conducted through the space C and within which the emulsion is brought substantially to a rest with almost complete absence of turbulence, convection currents, and rising bubbles of gas. Here again, the large volume of the chamber in comparison with the rate of flow through the treater creates a retention time of considerable duration for the emulsion so that adequate opportunity is provided for completion of the separation process and the stratification of the emulsion stream components into oil and water strata.

A gas equalizer pipe 28 of inverted U-shaped configuration extends between the upper walls of the chambers A and B and bridges the partition 14. Thus, pressures in the chambers A and B are equalized and provision is made for conducting evolved gas from the chamber A to the chamber B for discharge from the latter through a suitable gas outlet 29. For discharging oil from the chamber B, a small cylindrical drum 30 extends into the chamber through the head 12, and has an upstanding open-ended flume or spill pipe 31 projecting upwardly to a point adjacent the upper wall of the chamber B. Clean oil overflows into the flume 31 and passes downwardly to the drum 30 to accumulate therein. As the oil level in the drum 30 rises, a suitable float control 32 in the drum is actuated to open an oil discharge valve (not shown) connected into the oil discharge pipe 33 leading from the drum 30. Of course, a suitable gas back pressure valve may be connected to the outlet 29, and other conventional or suitable oil or gas discharge controls may be employed.

An important feature of the invention is the handling of the water removed from the incoming emulsion stream, it having been pointed out hereinbefore that the treater is provided with an unobstructed, continuous water discharge path in its lower portion. Any water settling from the chambers A or B, or both, and falling to the bottom of the tank 10 through the oil present therein, immediately flows to a water discharge conductor 34 connected into the bottom of the tank 10 adjacent the head 12. The conductor 34 leads through a cut-off valve or cock 35 to a small volume tank or enclosure 36 having at least a portion positioned in a horizontal plane below the bottom of tank 10. Oil may flow from the enclosure 36 to the chamber B through an oil equalizer pipe 37 connected into the head 12 and leading through a cut-off valve or plug 38 to the upper portion of the tank 36. An interface float control 39 is mounted in the volume tank 36 and controls the discharge of water therefrom through a water outlet 40. As shown in Fig. 1, the float 39 may be employed to operate any suitable type of pilot valve 38', the latter, in turn, operating a suitable motor or diaphragm valve 39' connected into the water discharge conductor 40' leading from the water outlet 40. Such structures are conventional and well known in this art.

As shown in Fig. 2, a water level, or water oil interface is maintained in the volume tank 36 in a horizontal plane below the bottom of the tank 10. Because the water is heavier than the oil, any water separated at any point from the tank 10 will thus flow immediately and continuously into the volume tank 36 whereby all surfaces of the tank 10 will be substantially constantly wet by oil rather than water, and most important, whereby no accumulation of separated water occurs within the tank 10. Experience has shown that it is this accumulated water that creates the most severe corrosion problem, and hence, exclusion of an accumulated body of water from the tank 10 materially reduces, if not eliminates, any internal corrosion thereof. Corrosion may occur within the small volume tank 36, but since the latter is small and simple in construction, it may be removed and replaced at negligible cost as compared with the expense of replacing the tank 10. One function of the valves or cocks 35 and 38 is to facilitate the disconnection and replacement of the tank 36.

Possibly contrary to expectations, the flow of the emulsion stream downwardly through the heating chamber A has proven advantageous both in providing the continuous, unimpeded discharge path for separated water, as well as for the efficient removal of dissolved gas from the stream prior to entry of the stream into the settling chamber B. The partition 14 completely isolates the intermediate and upper portions of the two chambers, and hence, excludes all of the turbulence and agitation of the heating chamber from the settling chamber. At the same time, all of the advantages of long, continuous, substantially unidirectional flow of the heated emulsion stream in the settling compartment is realized. While the path of movement of the oil and water particles has a vertical component, the predominant direction of movement is horizontal, and such movement is completely smooth and continuous with a minimum of agitation and of interference between upwardly moving oil particles and downwardly moving water particles. Of course, the positioning of the oil and water discharges adjacent the head 12 causes the oil and water to flow in the longest possible path in the treater while maintaining a minimum of turbulence and counter-current flow.

In Figs. 7 through 13 of the drawings, a modification of the invention is illustrated, this form of the invention providing a separate tank or vessel in which free water may be removed from the emulsion stream, along with some gas, prior to treating of the emulsion by subjecting the same to heat. In this form of the invention, the emulsion stream is conducted first into a relatively short, horizontal vessel 41 through an emulsion stream inlet 42 leading into an inlet box 43 disposed within the upper portion of the vessel 41. The inlet box is shown in detail in Fig. 13 and has a closed bottom 44 joined by closed sidewalls 45 whereby the fluid entering through the pipe 42 is caused to exit from the box through its open end 46. Vertical baffles 47, similar to the baffles 27 are positioned within the open end 46 of the box for reducing the velocity of the incoming stream and causing the same to enter the vessel 41 as a more or less smooth continuous flow.

The vessel 41 may be provided with a safety valve (not shown) or outlet 48 in its upper wall, and has a horizontally extending emulsion stream outlet 49 in its sidewall opposite the box 44. A water outlet 50 in the bottom wall of the vessel is protected by a narrow transverse baffle 51 spaced in the vessel 41 slightly above the water outlet. A narrow, transverse, horizontal baffle 52 is positioned between the box 44 and the emulsion stream outlet 49, the baffle intersecting the liquid surface established in the vessel by the elevation of the outlet 49 and serving to exclude from the liquid surface at the outlet 49 any turbulence created by the incoming fluid. A suitable liquid level control device 53, indicated in dotted lines in Fig. 8, responds in the conventional manner to the oil-water interface 54 existent within the vessel 41, and controls the discharge of water from the vessel through the water outlet 50.

The emulsion stream, upon entering the vessel 41, has its velocity of flow greatly reduced because of the large volume of the vessel 41, and hence, an opportunity is provided for free water to separate from the emulsion stream and settle into the lower portion of the vessel 41. The balance of the emulsion stream, along with any gas, is skimmed off through the pipe 49, while separated water is removed as such through the outlet 50. The removal of the water reduces the load upon the emulsion treater which follows. The large volume of the vessel 41 affords a prolonged retention time for the emulsion stream during which some of the emulsion may break, and the skimming off of the stream from the upper surface of the body of emulsion in the vessel 41 results in the delivering from the vessel of the cleanest or lightest emulsion. All of these results reduce the load upon the subsequent emulsion treating step thus enhancing the efficiency of the emulsion treater and reducing the heating requirements thereof.

The emulsion treater which is employed to carry out the emulsion treating steps subsequent to the preliminary water separation step includes an elongate, horizontal vessel 55 similar to the previously described vessel 10 and having a dished head 56 adjacent the vessel 41 and through which the oil outlet 49 extends. The opposite end of the vessel 55 is closed by a dished head 57 through which extends a firing unit 58 substantially identical to the firing unit 15. The vessel 55 is supported upon suitable bolsters 59, has a water outlet 60 in its bottom adjacent the head 56 and a transverse, vertical baffle 61 depending from its upper wall to a point spaced below its lower wall to divide the treating vessel into a heating compartment D and a settling compartment E. Also, like the vessel 10, the vessel 55 has a gas outlet 62 in its upper wall adjacent the head 56, and a gas equalizing conductor 63 of inverted U-shape spanning the partition 61 by being joined into the upper wall of the treating vessel and communicating with the upper portions of the chambers D and E. As shown in Fig. 10, clean oil is conducted from the chamber E by means of a cylindrical housing or drum 64 extending into the chamber E adjacent the head 56, and having a flume or weir 65 therefrom. As clean oil accumulates within the drum, it raises a float 66 actuating a suitable oil outlet valve (not shown) and permitting the discharge of oil from the drum through an oil outlet fitting 67.

A water level is carried in the lower portion of the vessel 55, and an interface float 68 (Fig. 11), by responding to fluctuations in the level of the interface between the oil and water strata, actuates a water discharge valve in the conventional manner (water discharge valve not shown) to control the discharge of water from the vessel 55 through the water outlet 60.

The operation of this form of the invention in treating the emulsion after the same has been processed in the preliminary water separation vessel 41 is substantially identical to that described for the first form of the invention with one important addition. The emulsion stream skimmed from the upper surface of the liquid in the vessel 41 and entering the emulsion conductor 49 is carried substantially throughout the horizontal length of the vessel 55 since the conductor 49 enters the emulsion treating vessel through the head 56 and extends horizontally through the upper portions of the chambers E and D. As shown in Figs. 8 and 9, the conductor 49 terminates in the upper portion of the vessel 55 adjacent the head 57, and thus, the emulsion stream is not only introduced into the vessel 55 at the end of said vessel remote from the oil and water discharge end, but also, the incoming emulsion stream is conducted entirely through the heated interior of the vessel 55. Since the liquids in the chamber D are being heated by the firing unit 58 and maintained at an elevated temperature thereby, and since the liquids in the chamber E will still be quite warm, a considerable degree of preheating of the emulsion stream passing through the elongate conductor 49 will be achieved. Such preheating is desirable not only to conserve heat and to cool the effluent liquids and gas to some extent, but also to commence the heating and emulsion breaking operation prior to direct contact of the incoming emulsion stream with the heated liquid in the chamber D. Such preheating results in a partial breaking of the emulsion, releasing additional water which may flow directly from the outlet of the pipe 49 to the lower portion of the vessel 55 because of the greater gravity of such separated water, and hence, the heating supplied by the firing unit 58 is directed primarily to the bringing of the remaining unbroken emulsion up to the desired treating temperature.

Upon discharge of the emulsion stream from the outlet end of the conductor 49, the stream flows slowly downwardly through the chamber D, being thoroughly heated in the course of such movement, and then passing into the chamber E by flowing under the lower edge of the partition 61. Here again, by far the major portion of the gas present will be removed in the chamber D and passed to the upper portion of the chamber E by the equalizing conductor 63. Thus, the chamber E is protected against turbulence created by evolving gas, and the quiescence so important to separation and stratification is maintained. Upon entering the upper portion of the chamber E through the equalizing connection 63, the warm gas and vapors from the chamber E are brought into proximity with the relatively cool conductor 49, and hence, some portion of the vapors present will be condensed. These light and valuable hydrocarbons so condensed will be retained within the clean oil layer within the chamber E. Similar condensation and retention of light hydrocarbon vapors will occur in the upper portion of the chamber D since the vapors, in rising from the body of heated liquid present in the chamber will have opportunity to contact the relatively cool conductor 49, also extending longitudinally of the upper portion of the chamber D, and such condensates will therefore fall from the pipe 49 back into the bodies of liquid present in both the chambers D and E.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An emulsion treater including, a vessel having an emulsion stream inlet, means for withdrawing clean oil and gas from the vessel, a water outlet from the vessel, means for heating the emulsion, a small readily-disconnectable water volume tank connected to the water outlet by a separable fitting and having a portion below the lower end of the vessel, a water outlet from the tank, and means for maintaining a water level in the tank at an elevation below the lower end of the vessel whereby water separated in the vessel flows immediately to the volume tank and corrosion of the vessel by accumulation of a body of separated water therein is precluded.

2. An emulsion treater including, a vessel having an emulsion stream inlet, means for withdrawing clean oil and gas from the vessel, a water outlet from the vessel, means for heating the emulsion, walls defining a small readily-disconnectable water accumulation enclosure communicating with the bottom of the vessel, the enclosure being connected to the vessel through the water outlet by a separable fitting whereby separated water drains from the vessel into the enclosure and whereby the enclosure may readily be disconnected from the vessel, the enclosure having at least a portion in a horizontal plane below the bottom of the vessel, and means for maintaining a water level in the enclosure at an elevation below the bottom of the vessel whereby water separated in the vessel flows immediately to the enclosure and corrosion of the vessel by accumulation of a body of separated water therein is precluded.

3. An emulsion treater including, a vessel having an emulsion stream inlet, means for withdrawing clean oil and gas from the vessel, a water outlet from the vessel, means for heating the emulsion, a small readily-disconnectable water volume tank, a conductor connecting the water volume tank to the water outlet of the vessel, a valve disconnectably mounted in said conductor, a water outlet from the volume tank, a second conductor connecting the upper portion of the volume tank to the vessel, a valve disconnectably mounted in the second conductor, and means for maintaining a water level in the tank at an elevation below the bottom of the vessel.

4. An emulsion treater including, an elongate horizontal vessel, a vertical partition in the vessel dividing the vessel into a heating chamber and a stratification chamber, heating means in the heating chamber for heating an emulsion stream, an emulsion stream inlet to the heating chamber above the heating means, means for flowing substantially all of the emulsion stream downwardly in the heating chamber and over the heating means to heat the emulsion stream, means for flowing substantially all of the heated emulsion stream from the lower portion of the heating chamber to the lower portion of the stratification chamber, a water outlet from the lower portion of the stratification chamber, and means for discharging clean oil and gas from the upper portion of the stratification chamber.

5. An emulsion treater including, an elongate horizontal vessel, a vertical partition in the vessel dividing the vessel into a heating chamber and a stratification chamber, heating means in the heating chamber for heating an emulsion stream, an emulsion stream inlet to the heating chamber above the heating means adjacent one end wall of the vessel, means for flowing substantially all of the emulsion stream downwardly in the heating chamber and over the heating means to heat the emulsion stream, means for flowing substantially all of the heated emulsion stream from the lower portion of the heating chamber to the lower portion of the stratification chamber, a water outlet from the lower portion of the stratification chamber, and means for discharging clean oil and gas from the upper portion of the stratification chamber, the water outlet and the clean oil and gas discharge means being adjacent the opposite end wall of the vessel.

6. An emulsion treater including, an elongate horizontal vessel, a vertical partition in the vessel dividing the vessel into a heating chamber and a stratification chamber, heating means in the heating chamber for heating an emulsion stream, an emulsion stream inlet to the heating chamber above the heating means, means for flowing substantially all of the emulsion stream downwardly in the heating chamber and over the heating means to heat the emulsion stream, means for flowing substantially all of the heated emulsion stream from the lower portion of the heating chamber to the lower portion of the stratification chamber, a water outlet from the lower portion of the stratification chamber, means for discharging clean oil and gas from the upper portion of the stratification chamber, and a gas conductor communicating between the upper portions of the heating and stratification chambers.

7. An emulsion treater as set forth in claim 4, wherein the emulsion stream inlet comprises an elongate conductor extending through the upper portions of the heating and stratification chambers and opening into the heating chamber adjacent the top wall thereof.

8. An emulsion treater as set forth in claim 4 wherein the means for flowing the heated emulsion stream from the heating chamber to the stratification chamber is disposed in a horizontal plane below the heating means, and the heating means comprises walls enclosing a compartment adapted to receive a body of heat exchange fluid and having a fire tube therein.

9. An emulsion treater as set forth in claim 4, a preliminary water separation enclosure, an emulsion inlet to the enclosure, a water outlet from the enclosure, and the emulsion stream inlet to the heating compartment of the vessel comprising an elongate conductor leading from the upper portion of the enclosure through the upper portions of the stratification and heating chambers to a point in the heating chamber adjacent the top wall thereof and one end wall of the vessel.

10. An emulsion treater as set forth in claim 4, a preliminary water separation enclosure, an emulsion inlet to the enclosure, a water outlet from the enclosure, a gas conductor leading from the top of the heating chamber to the top of the stratification chamber having an inverted U-shape, and the emulsion stream inlet to the heating compartment of the vessel comprising an enlongate conductor leading from the upper portion of the enclosure through the upper portions of the stratification and heating chambers to a point in the heating chamber adjacent the top wall thereof and one end wall of the vessel.

11. The method of treating well emulsion streams to resolve the stream into oil and water strata including the steps of, conducting the emulsion stream into a heating zone, flowing substantially all the stream downwardly in the heating zone while heating the stream and driving off gas, withdrawing gas from the upper portion of the heating zone, withdrawing substantially all the heated emulsion stream horizontally from the lower portion of the heating zone, directing the withdrawn heated emulsion stream horizontally into a stratification zone, flowing the emulsion stream in an elongate unidirectional substantially horizontal path in the stratification zone, withdrawing gas, and withdrawing clean oil and water.

12. The method of treating well emulsion streams to resolve the stream into oil and water strata including the steps of, conducting the emulsion stream into the upper portion of a heating zone, flowing substantially all the stream downwardly in the heating zone while heating the stream and driving off gas, withdrawing gas from the upper portion of the heating zone, withdrawing substantially all the heated emulsion stream horizontally from the lower portion of the heating zone, directing the withdrawn heated emulsion stream horizontally into a stratification zone, conducting the gas withdrawn from the upper portion of the heating zone to the upper portion of the stratification zone, flowing the emulsion stream in an elongate unidirectional substantially horizontal path in the stratification zone, withdrawing gas, and withdrawing clean oil and water.

References Cited in the file of this patent

UNITED STATES PATENTS

| | | |
|---|---|---|
| 2,152,863 | Bills | Apr. 4, 1939 |
| 2,179,131 | Millard | Nov. 7, 1939 |
| 2,353,138 | Beach | July 11, 1944 |
| 2,366,302 | Welch | Jan. 2, 1945 |
| 2,579,184 | Glasgow et al. | Dec. 18, 1951 |
| 2,586,221 | Glasgow | Feb. 19, 1952 |
| 2,601,903 | Erwin | July 1, 1952 |
| 2,601,904 | Erwin | July 1, 1952 |
| 2,681,150 | Reid | June 15, 1954 |
| 2,685,938 | Walker et al. | Aug. 10, 1954 |
| 2,706,531 | Lovelady et al. | Apr. 19, 1955 |